(12) United States Patent
Yang

(10) Patent No.: US 11,513,363 B2
(45) Date of Patent: Nov. 29, 2022

(54) SPECKLE ELIMINATION APPARATUS, LASER LIGHT SOURCE AND LASER PROJECTION SYSTEM

(71) Applicant: GOERTEK INC., Shandong (CN)

(72) Inventor: Lebao Yang, Shandong (CN)

(73) Assignee: GOERTEK INC., Shandong (CN)

( * ) Notice: Subject to any disclaimer, the term of this patent is extended or adjusted under 35 U.S.C. 154(b) by 287 days.

(21) Appl. No.: 16/753,564

(22) PCT Filed: Dec. 8, 2017

(86) PCT No.: PCT/CN2017/115238
§ 371 (c)(1),
(2) Date: Apr. 3, 2020

(87) PCT Pub. No.: WO2019/100451
PCT Pub. Date: May 31, 2019

(65) Prior Publication Data
US 2020/0301158 A1  Sep. 24, 2020

(30) Foreign Application Priority Data

Nov. 22, 2017 (CN) .......................... 201721572796.3

(51) Int. Cl.
*G02B 27/48* (2006.01)
*G02B 27/28* (2006.01)

(52) U.S. Cl.
CPC ........... *G02B 27/48* (2013.01); *G02B 27/288* (2013.01)

(58) Field of Classification Search
CPC .............................. G02B 27/48; G02B 27/288
USPC ...................................................... 359/489.07
See application file for complete search history.

(56) References Cited

U.S. PATENT DOCUMENTS

2008/0088898 A1\* 4/2008 Szarvas ................ G03H 1/0402
359/24
2012/0062848 A1\* 3/2012 Koyanagi ............ G02B 27/286
353/20

\* cited by examiner

*Primary Examiner* — Marin Pichler
*Assistant Examiner* — Mitchell T Oestreich
(74) *Attorney, Agent, or Firm* — Paratus Law Group, PLLC

(57) ABSTRACT

A speckle elimination apparatus, a laser light source and a laser projection system, the speckle elimination apparatus comprising a wave plate (100) and a transmission plate (200) respectively arranged on a laser beam light path, the wave plate (100) and the transmission plate (200) having similar refractive indices and closely arranged adjacent sides, the wave plate (100) being arranged so that an incident surface allows a portion of an incident laser beam to pass through, the transmission plate (200) being arranged so that an incident surface allows the remainder of the incident laser beam to pass through, the portion of the incident laser beam being 25%-75% of the incident laser beam. The speckle elimination apparatus eliminates the phenomenon of laser speckle, and prevents stray light from being produced during laser speckle elimination.

17 Claims, 1 Drawing Sheet ured on a laser beam optical path, wherein refractive indexes of the wave plate and the transmission plate are close; adjacent sides of the wave plate and the transmission plate are closely arranged; the wave plate is arranged to allow a portion of an incident laser beam to pass through an incident surface of the wave plate, the transmission plate is arranged to allow the remainder of the incident laser beam to pass through an incident surface of the transmission plate; the portion of the incident laser beam occupies 25%-75% of the incident laser beam.

SPECKLE ELIMINATION APPARATUS, LASER LIGHT SOURCE AND LASER PROJECTION SYSTEM

CROSS REFERENCE TO PRIOR APPLICATION

This application is a National Stage Patent Application of PCT International Patent Application No. PCT/CN2017/115238 (filed on Dec. 8, 2017) under 35 U.S.C. § 371, which claims priority to Chinese Patent Application No. 201721572796.3 (filed on Nov. 22, 2017), which are all hereby incorporated by reference in their entirety.

FIELD OF THE INVENTION

The invention relates to the field of laser technologies, and in particular to a speckle elimination apparatus, a laser light source and a laser projection system.

BACKGROUND OF THE INVENTION

The laser light source has features such as high monochromaticity, high coherence, high directivity and high brightness. When the laser light source is used as a light source of a projection system, the laser beam itself may generate spot interference (self-coherence) due to the high coherence of laser. The conditions for generating the self-coherence by the laser beam are: laser frequencies are the same, vibration directions are identical, and the phase difference is constant. The spot interference may result in the formation of stray light with nonuniform brightness at the side of a laser emergent spot, which is referred to as a laser speckle. The laser speckle phenomenon may affect the imaging effect of the projection. Therefore, there is a need to provide a speckle elimination apparatus, a laser light source and a laser projection system that can eliminate the laser speckle phenomenon by changing the vibration direction of a portion of the laser beam.

SUMMARY OF THE INVENTION

The objective of the invention is to provide a speckle elimination apparatus, a laser light source and a laser projection system, so as to eliminate a laser speckle phenomenon by changing a polarization state of a portion of a whole laser beam.

In order to achieve the above objective, the invention adopts the following technical solutions.

The invention discloses a speckle elimination apparatus, comprising a wave plate and a transmission plate respectively arranged on a laser beam optical path, wherein refractive indexes of the wave plate and the transmission plate are close and adjacent sides thereof are closely arranged; the wave plate is arranged to allow a portion of an incident laser beam to pass through an incident surface thereof, the transmission plate is arranged to allow the remainder of the incident laser beam to pass through an incident surface thereof, and the portion of the incident laser beam occupies 25%-75% of the incident laser beam.

Preferably, the portion of the incident laser beam occupies 50% of the incident laser beam.

Preferably, the wave plate is a half-wave plate.

Preferably, the adjacent sides of the wave plate and the transmission plate are fixedly bonded to each other.

Preferably, the wave plate is a rectangular-shaped, semicircular-shaped, or semioval-shaped wave plate, and correspondingly, the transmission plate is a rectangular-shaped, semicircular-shaped, or semioval-shaped transmission plate.

Preferably, the wave plate is an annular wave plate having a central opening, and the transmission plate is a transmission plate that matches a shape of the opening. Further preferably, the wave plate is an annular wave plate having a central opening of a centrosymmetric shape. Further preferably, the wave plate is an annular wave plate having a central circular opening.

The invention further discloses a laser light source, comprising a laser device for emitting a laser beam, and further comprising the speckle elimination apparatus described above.

The invention further discloses a laser projection system, comprising the laser light source described above.

The present invention has the following beneficial effects: According to the technical solutions of the invention, the laser speckle phenomenon can be eliminated by changing a vibration direction (i.e., the polarization state) of a portion of the whole laser beam, thereby eliminating the effect of the laser speckle phenomenon on a laser imaging picture. Further, according to the technical solutions of the invention, stray light caused by refraction of the laser beam at a side face of the wave plate when the laser beam is not vertically incident at the incident surface of the wave plate can be eliminated by means of the transmission plate, thereby eliminating the effect of the possible stray light on the laser imaging picture. In addition, the technical solutions of the invention has a small size, a simple structure, and high reliability.

BRIEF DESCRIPTION OF THE DRAWINGS

The specific embodiments of the present invention will be further described below with reference to the drawings.

DETAILED DESCRIPTION OF THE PREFERRED EMBODIMENTS

Figure 1:
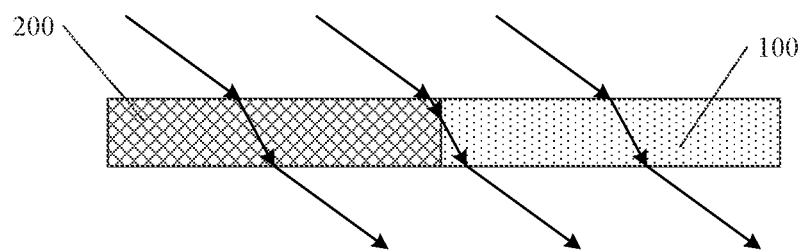
FIG. 1 illustrates a sectional view of a speckle elimination apparatus.

In order to describe the invention more clearly, the invention will be further described below in combination with the preferred embodiments and the drawings. Similar components in the drawings are denoted by the same reference signs. Those skilled in the art should understand that the following detailed description is merely for illustration instead of limitation, and the protection scope of the invention shall not be limited thereto.

As shown in FIG. 1, a speckle elimination apparatus provided by this embodiment comprises a wave plate 100 and a transmission plate 200 respectively on a laser beam optical path, wherein refractive indexes of the wave plate 100 and the transmission plate 200 are close; adjacent sides of the wave plate 100 and the transmission plate 200 are closely arranged; the wave plate 100 is arranged to allow a portion of an incident laser beam to pass through an incident surface of the wave plate 100, the transmission plate 200 is arranged to allow the remainder of the incident laser beam to pass through an incident surface of the transmission plate 200; the portion of the incident laser beam occupies 25%-75% of the incident laser beam, that is, the portion of the incident laser beam that passes through the incident surface of the wave plate 100 occupies 25%-75% of the whole incident laser beam, and correspondingly, the remainder of the incident laser beam that passes through the incident surface of the transmission plate 200 occupies 75%-25% of the whole incident laser beam.

Figure 2:
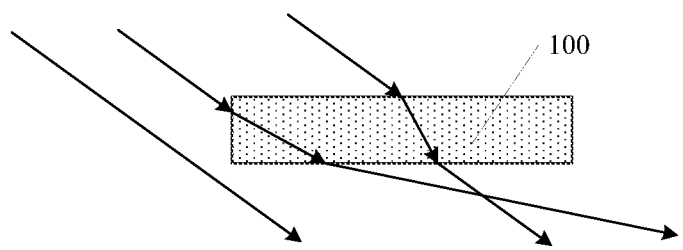
FIG. 2 illustrates a sectional view of a speckle elimination apparatus that adopts only a wave plate and adopts no transmission plate.

In the speckle elimination apparatus provided by this embodiment, on the one hand, a vibration direction (i.e., polarization state) of the portion of the incident laser beam that passes through the incident surface of the wave plate 100 is changed, while a vibration direction (i.e., polarization state) of the remaining laser beam that passes through the incident surface of the transmission plate 200 that is to say, the remaining laser beam that does not pass through the incident surface of the wave plate 100 is not changed. Therefore, the speckle elimination apparatus provided by this embodiment divides the incident laser beam into two laser beam portions having different vibration directions (i.e., polarization states), and since the vibration directions (i.e., polarization states) of the two laser beam portions are different, interference will not occur between the two laser beam portions, thereby eliminating a laser speckle phenomenon of the incident laser beam, and thus eliminating the effect of the laser speckle phenomenon on a laser imaging picture. On the other hand, if there is only the wave plate 100 and not the transmission plate 200, a portion of laser beam will be incident at a side face of the wave plate 100 when the incident laser beam is not vertically incident at the incident surface of the wave plate 100, as shown in FIG. 2. After two times of refraction at the incident surface and an emergent surface of the wave plate 100, an optical path propagation direction of the portion of the laser beam that is incident at the incident surface of the wave plate 100 is not changed. However, when passing through the side face of the wave plate 100, the portion of laser beam that is incident at the side face of the wave plate 100 generates a refraction angle different from a refraction angle generated by the portion of laser beam that is incident at the incident surface of the wave plate 100 when passing through the incident surface of the wave plate 100, resulting in deflection of an emergent direction of the laser beam portion that is incident at the side face of the wave plate 100 after re-refraction at the emergent surface of the wave plate 100, causing stray light in the whole laser beam, thereby affecting beam combination of the whole laser beam and affecting the laser imaging picture. As shown in FIG. 1, in the speckle elimination apparatus provided by this embodiment, as the adjacent sides of the wave plate 100 and the transmission plate 200 are closely arranged, the laser beam portion that is incident at the side face of the wave plate 100 is firstly subject to refraction at the incident surface of the transmission plate 200 and refraction at the side face of the transmission plate 200 when the incident laser beam is not vertically incident at the incident surface of the wave plate 100; since the refractive indexes of the wave plate 100 and the transmission plate 200 are close, after re-refraction at the emergent surface of the wave plate 100, an emergent direction of said laser beam portion is not deflected, that is, being the same as that of the remaining laser beam portion. That is, optical path propagation directions of the whole emergent laser beam emerging from the speckle elimination apparatus provided by this embodiment and the whole incident laser beam coming into the speckle elimination apparatus provided by this embodiment are the same. Therefore, the speckle elimination apparatus provided by this embodiment can eliminate the stray light caused by refraction of the laser beam at the side face of the wave plate 100 when the laser beam is not vertically incident at the incident surface of the wave plate 100, thereby eliminating the effect of the possible stray light on the laser imaging picture.

In a specific implementation, the portion of the incident laser beam occupies 50% of the incident laser beam. In this case, a polarization state of a half of the whole incident laser beam can be changed, so that the laser beam portion having an unchanged polarization state or the laser beam portion having a changed polarization state in the whole incident laser beam occupies a half of the whole incident laser beam respectively, achieving a better effect of eliminating the laser speckle phenomenon of the incident laser beam.

In a specific implementation, the wave plate 100 is a half-wave plate. In this case, the vibration direction of the laser beam portion having a changed polarization state is perpendicular to that of the remaining laser beam portion having an unchanged polarization state, achieving a better effect of eliminating the laser speckle phenomenon of the incident laser beam. For example, when the incident laser beam is an S-linearly polarized light beam, the laser beam portion having a changed polarization state is converted into P-linearly polarized light, and the remaining laser beam portion having an unchanged polarization state is still an S-linearly polarized light beam. Since vibration directions of the P-linearly polarized light beam and the S-linearly polarized light beam are perpendicular to each other, interference will not be formed therebetween, thereby eliminating the laser speckle phenomenon of the incident laser beam. Similarly, when the incident laser beam is P-linearly polarized light, a portion of the incident laser beam is converted into S-linearly polarized light, likewise eliminating the laser speckle phenomenon of the incident laser beam.

In a specific implementation, the adjacent sides of the wave plate 100 and the transmission plate 200 are fixedly bonded to each other.

In a specific implementation, as a preferred manner, the wave plate 100 is a rectangular-shaped, semicircular-shaped, or semioval-shaped wave plate, and correspondingly, the transmission plate 200 is a rectangular-shaped, semicircular-shaped, or semioval-shaped transmission plate, that is, both the wave plate 100 and the transmission plate 200 are rectangular-shaped, semicircular-shaped (planar sides of semicircles are closely arranged), or semioval-shaped (planar sides of semiovals are closely arranged). Certainly, the above preferred shapes are used to facilitate production and close arrangement of the wave plate 100 and the transmission plate 200. In addition to the above preferred shapes, the wave plate 100 and the transmission plate 200 can be in other shapes, and the shapes thereof may be different.

Figure 3:
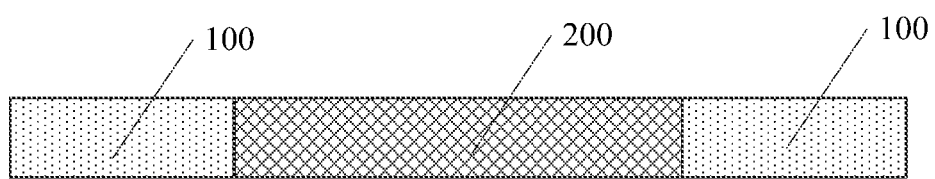
FIG. 3 illustrates a sectional view of a speckle elimination apparatus that adopts an alternative manner.

In a specific implementation, as another preferred manner, the wave plate 100 is an annular wave plate having a central opening, and the transmission plate 200 is a transmission plate that matches a shape of the opening. In this case, those skilled in the art could understand that "the adjacent sides of the wave plate 100 and the transmission plate 200 are closely arranged" means that an inner side surface of the opening of the annular wave plate and an outer side surface of the transmission plate that matches the opening are closely arranged. Further preferably, the wave plate 100 is an annular wave plate having a central opening of a centrosymmetric shape, and correspondingly, the transmission plate 200 is a centrosymmetric-shaped transmission plate that matches a shape of the centrosymmetric-shaped opening. More preferably, as shown in FIG. 3, the wave plate 100 is an annular wave plate having a central circular opening, and correspondingly, the transmission plate 200 is a circular transmission plate that matches a shape of the circular opening.

In a specific implementation, the speckle elimination apparatus may further comprise a diaphragm on an emergent optical path of the wave plate 100 and the transmission plate 200. Further, both the wave plate 100 and the transmission plate 200 are arranged close to the diaphragm in an optical path direction, so that an effect of limiting the incident laser beam by the diaphragm is better, and miniaturization of the speckle elimination apparatus becomes possible, thereby saving the space and reducing an overall size of the apparatus.

Further, this embodiment provides a laser light source, comprising a laser device for emitting a laser beam and the speckle elimination apparatus described above, wherein a laser speckle phenomenon of the laser beam emitted by the laser device can be eliminated after the laser beam passes through the speckle elimination apparatus.

Further, this embodiment provides a laser projection system comprising the laser light source described above.

In the description of the invention, it should be noted that the orientation or positional relationship indicated by the terms such as "upper", or "lower" is based on the orientation or positional relationship shown in the drawings, and is merely for convenience in description of the invention and simplification of the description, instead of an indication or implication that the apparatus or component necessarily has a specific orientation, or is constructed and operated in a specific orientation, thus cannot be construed as a limitation to the invention. Unless specifically stated and limited, the terms "mounted", "bonded", and "connected" should be understood in a broad sense, and may be, for example, a fixed connection, a detachable connection, or an integral connection; may be a mechanical connection, or an electrical connection; may be a direct connection, an indirect connection via an intermediate medium, or an inner connection between two components. For those skilled in the art, the specific meanings of the above terms in the invention can be understood according to specific situations.

It should also be noted that in the description of the invention, relational terms such as first and second are merely used to distinguish one entity or operation from another entity or operation, without necessarily requiring or implying that there is any such actual relationship or sequence between these entities or operations. Furthermore, the term "comprise" or "contain" or any other variations thereof is intended to encompass a non-exclusive inclusion, such that a process, a method, an item, or a device that includes a series of elements includes not only those elements but also other elements which are not explicitly listed, or further includes elements inherent to such the process, method, item, or device. In the case of no more limitation, an element defined by the phrase "comprising a . . . " does not exclude the presence of additional equivalent elements in the process, method, item, or device that comprises the element.

Obviously, the embodiments of the invention described above are merely examples for clear illustration of the invention, instead of a limitation to the implementations of the invention. Based on the above description, those skilled in the art could make variations or modifications in other different forms. All the implementations cannot be exhaustively listed herein, and any obvious variations or modifications derived from the technical solutions of the invention still fall within the protection scope of the invention.

The invention claimed is:

1. A speckle elimination apparatus, comprising:
a wave plate and a transmission plate respectively on a laser beam optical path, wherein
refractive indexes of the wave plate and the transmission plate are within a predetermined value such that a direction of a laser beam emerging from the wave plate is same as a direction of a portion of the laser beam that does not pass through an incident surface of the wave plate and adjacent sides thereof in a direction orthogonal to a direction of the laser beam optical path are attached to each other,
the wave plate is arranged to allow a portion of an incident laser beam to pass through an incident surface thereof,
the transmission plate is arranged to allow a remainder of the incident laser beam to pass through an incident surface thereof, and
the portion of the incident laser beam occupies 25%-75% of the incident laser beam.

2. The speckle elimination apparatus according to claim 1, wherein the portion of the incident laser beam occupies 50% of the incident laser beam.

3. The speckle elimination apparatus according to claim 1, wherein the wave plate is a half-wave plate.

4. The speckle elimination apparatus according to claim 1, wherein the adjacent sides of the wave plate and the transmission plate are fixedly bonded to each other.

5. The speckle elimination apparatus according to claim 1, wherein the wave plate is a rectangular-shaped, semicircular-shaped, or semioval shaped wave plate, and correspondingly, the transmission plate is a rectangular-shaped, semicircular-shaped, or semioval-shaped transmission plate.

6. The speckle elimination apparatus according to claim 1, wherein the wave plate is an annular wave plate having a central opening, and the transmission plate is a transmission plate that matches a shape of the opening.

7. The speckle elimination apparatus according to claim 6, wherein the wave plate is an annular wave plate having a central opening of a centrosymmetric shape.

8. The speckle elimination apparatus according to claim 7, wherein the wave plate is an annular wave plate having a central circular opening.

9. A laser light source, comprising a laser device for emitting a laser beam, and further comprising the speckle elimination apparatus according to claim 1.

10. A laser projection system, comprising the laser light source according to claim 9.

11. A laser light source, comprising a laser device for emitting a laser beam, and further comprising the speckle elimination apparatus according to claim 2.

12. A laser light source, comprising a laser device for emitting a laser beam, and further comprising the speckle elimination apparatus according to claim 3.

13. A laser light source, comprising a laser device for emitting a laser beam, and further comprising the speckle elimination apparatus according to claim 4.

14. A laser light source, comprising a laser device for emitting a laser beam, and further comprising the speckle elimination apparatus according to claim 5.

15. A laser light source, comprising a laser device for emitting a laser beam, and further comprising the speckle elimination apparatus according to claim 6.

16. A laser light source, comprising a laser device for emitting a laser beam, and further comprising the speckle elimination apparatus according to claim 7.

17. A laser light source, comprising a laser device for emitting a laser beam, and further comprising the speckle elimination apparatus according to claim 8.

\* \* \* \* \*